United States Patent Office 2,929,854
Patented Mar. 22, 1960

2,929,854

PROCESS FOR THE SODIUM CATALIZED HYDROGENATION OF NAPHTHALENE

Thomas P. Wilson, Charleston, and George F. Hurley, St. Albans, W. Va., assignors to Union Carbide Corporation, a corporation of New York No Drawing. Application March 14, 1957
Serial No. 645,899

17 Claims. (Cl. 260—667)

This invention relates to organic processes, and more particularly, to a process for the hydrogenation of naphthalene.

Metallic sodium is known to catalyze the liquid phase hydrogenation of naphthalene selectively to tetralin. In this reaction, the sodium catalyst also serves to remove sulfur-containing compounds from the reactants. The necessity of utilizing a sulfur-free naphthalene as feed is thereby eliminated, and the quality of tetralin produced substantially improved.

A disadvantage encountered in the commercial application of this process, however, is the relatively low reaction rates (i.e. rates of hydrogenation or conversion of naphthalene to tetralin) that are obtained, even at elevated temperatures of from 300° C. to 350° C., and at hydrogen pressures of 3,000 pounds per square inch gauge, or more. High reaction rates are nevertheless found necessary if substantial yields of tetralin are to be obtained within an efficient operating period. Moreover, the use of elevated temperatures and pressures during this reaction in an effort to attain high rates of hydrogenation necessarily involves the utilization of equipment and material capable of producing and withstanding such temperatures and pressures, and represents a costly and complex operation.

It is an object of the present invention to provide an improved process for the sodium catalyzed hydrogenation of naphthalene whereby reaction rates higher than those heretofor obtainable may be attained. It is another object of the present invention to provide an improved process for the sodium catalyzed hydrogenation of naphthalene, which process may be satisfactorily performed at operating temperatures of 300° C. or less, and hydrogen pressures of 3,000 pounds per square inch gauge or less.

The present invention is based in part upon the discovery that organic compounds consisting of aromatic nitrogen heterocycles containing a pyridine ring will serve as accelerators for the sodium catalyzed hydrogenation of naphthalene. For convenience, these organic compounds will hereinafter be referred to as "quinoline-type" accelerators.

In accordance with the process of the invention, when hydrogen is reacted with naphthalene in the presence of a sodium catalyst and a quinoline-type accelerator, as prescribed herein, the resulting rates of hydrogenation are increased sufficiently to warrant commercial application of the process. Furthermore, the hydrogenation of naphthalene will proceed satisfactorily at temperatures and pressures lower than those heretofore believed to be necessary for the efficient production of tetralin, thereby permitting a more convenient and economical process.

The quinoline-type accelerators found suitable for use in the process of the invention may be exemplified by members of the following groups of organic compounds: quinolines, acridines, pyridines, and alkyl-substituted derivatives of each group. Specific examples of quinoline-type accelerators which have been found to engender good results are:

Quinoline
2-methylquinoline
4-methylquinoline
7-methylquinoline
2,6-dimethylquinoline
Acridine
Alpha-picoline However, other organic compounds, such as isoquinolines and pyridopyridines, similarly consisting of aromatic nitrogen heterocycles containing a pyridine ring may also be employed in the process of the invention as accelerators for the sodium catalyzed hydrogenation of naphthalene.

The resulting rates of hydrogenation obtained in accordance with the present process have been determined to be of the first order with respect to naphthalene concentration. First order reaction rate constants may therefore be determined both from hydrogen pressure decrease during the experiment and from naphthalene analysis at its conclusion. Table I, below, based upon these first order reaction rate constants, will better serve to illustrate the quantitative effectiveness of quinoline-type accelerators in the process of the invention. Experiments from which the tabulated data was obtained were performed under the following operating conditions: temperatures of approximately 285° C., hydrogen pressures of approximately 2,500 pounds per square inch gauge and catalyst and accelerator concentrations of about 5 parts to 100 parts of naphthalene (80.2° C. freezing point) by weight, unless otherwise indicated in the table.

TABLE I

| Accelerator: | First order reaction rate constant (1/min.) |
|---|---|
| None | 0.002 |
| Quinoline | 0.033 |
| 2-methylquinoline | 0.043 |
| 4-methylquinoline | 0.044 |
| 7-methylquinoline | 0.034 |
| 2,6-dimethylquinoline | 0.022 |
| Acridine (4 percent concentration) | 0.025 |
| 2-methylpyridine | 0.012 |

From the above table it may be seen that quinoline-type accelerators differ in their effectiveness for accelerating the sodium catalyzed hydrogenation of naphthalene. The preferred accelerators are those which, when employed under the operating conditions heretofore mentioned (i.e. temperatures of 285° C., hydrogen pressures of 2,500 pounds per square inch gauge and accelerator and catalyst concentrations of 5 percent by weight of naphthalene) will engender rates of hydrogenation which can be represented by first order reaction rate constants of 0.02/min., or more. These operating conditions are not intended to limit the present invention, but merely serve as a basis for determining the preferred accelerators.

When utilizing quinoline-type accelerators as prescribed by the present invention, the resulting rates of hydrogenation have been found to be independent of hydrogen pressures above approximately 500 pounds per square inch gauge. Accordingly, no appreciable change in the conversion rate of naphthalene to tetralin is effected by a variance in hydrogen pressure above this level. At hydrogen pressures of below approximately 500 pounds per square inch gauge, a rapid decrease in the reaction rate has been found to occur with decreasing pressure. This rate decrease may be such that ultimately little or no conversion to tetralin is achieved. Generally, therefore, hydrogen pressures of above approximately 500 pounds per square inch gauge have been found most satisfactory for use with quinoline-type accelerators in the process of the invention.

For good results, the present process should be carried out at temperatures of between about 200° C. and 300° C. Operation at temperatures below this range will ordinarily produce only negligible rates of hydrogenation and consequently a rate of tetralin production insufficient for commercial purposes. As the temperature increases above 200° C. the reaction rate has been found to increase exponentially. When the process is operated at temperatures above 300° C., however, the advantage of an increased rate of hydrogenation is usually not commensurate with the additional use of special apparatus and other operating procedures necessary to effect the higher reaction temperatures. Moreover, at temperatures above 300° C., decomposition of the tetralin produced is frequently encountered.

Rates of hydrogenation have been found to vary in direct proportion to the concentration of accelerator that is employed in the present process, an increase in accelerator concentration effecting an increase in the conversion rate of naphthalene to tetralin. Best results have been obtained when the quinoline-type accelerators are utilized in concentrations of from about 1 to 10 parts of accelerator to 100 parts of naphthalene by weight. Concentrations of below about 0.5 part of accelerator to 100 parts of naphthalene by weight have not been found to engender increased rates of hydrogenation. The use of concentrations above approximately 35 parts of accelerator to 100 parts of naphthalene by weight is not recommended, since, at these higher concentrations, the accelerator may dilute the reaction mixture to such an extent that the naphthalene capacity of the reactor would be excessively decreased.

In an embodiment of the present invention, quinoline-type accelerators are added in concentrations as heretofore prescribed to a mixture of naphthalene and metallic sodium in a suitable reactor or autoclave. A minimal proportion of 2.5 parts of sodium to 100 parts of naphthalene (78° C. freezing point) by weight was found to be desirable. The minimal sodium concentration that is required may be as low as about 0.5 part of sodium to 100 parts of naphthalene by weight when relatively purer naphthalene (e.g. 80.2° C. freezing point) is utilized. It is to be noted in this respect that any grade of naphthalene may be employed in the process of the invention.

A considerable excess over the minimum sodium requirement is recommended to obviate difficulties which may arise, for example, due to the condensation of moisture in the reaction vessel, or to losses to handling. Concentrations of sodium above approximately 5.0 parts of sodium to 100 parts of naphthalene, however, have not been found to effect an additional increase in the rates of hydrogenation thereby obtained.

Hydrogen is subsequently introduced to the reaction system, the hydrogen pressure and reaction temperature adjusted to within the ranges described above, and the reaction carried out to completion as determined by a decrease in hydrogen pressure. Hydrogenation is generally discontinued when the rate of decrease in hydrogen pressure becomes less than about one pound per square inch per minute. Upon completion of the hydrogenation, tetralin may be separated or removed from the resultant products.

In accordance with the present invention, a further advantage may accrue. Co-pending application, Serial No. 645,901, filed March 14, 1957, relates to the use of organic compounds containing a hydrogen atom sufficiently active to be replaced in reaction by metallic sodium as accelerators for the sodium catalyzed hydrogenation of naphthalene. These compounds are referred to in the co-pending application as "active-hydrogen accelerators." In one embodiment of the present invention an added, synergistic effect is achieved by carrying out the sodium catalyzed hydrogenation of naphthalene in the presence of mixed accelerators, wherein a quinoline-type accelerator, such as quinoline or an alkyl-substituted quinoline, is utilized in combination with an active-hydrogen accelerator, the latter preferably possessing at least one alcoholic hydroxyl group. Among the members of this latter group of organic compounds are aliphatic alcohols, such as isopropanol and 2-ethylhexanol. Other active-hydrogen accelerators, e.g., N-2-hydroxyethyl oleamide, propylene chlorohydrin and stearic acid, however, may also contribute to this synergistic effect when used in conjunction with a quinoline-type accelerator as herein mentioned.

The reaction rates obtained by the use of mixed accelerators, as prescribed by the preferred embodiment of the invention, have also been determined to be of the first order with respect to naphthalene concentration. The advantageous and synergistic effect of employing these mixed accelerators may be seen in Table II, below, based upon the first order reaction rate constants. The accelerator concentrations are indicated in the table as percentages by weight of naphthalene (80.2° C. freezing point). Sodium concentrations of 5 parts to 100 parts of naphthalene were utilized in the experiments from which the data was obtained.

TABLE II

| Accelerator | Accelerator Concentration, percent | Temperature, °C. | Hydrogen Pressure (p.s.i.g.) | First Order Reaction Rate Constant (1/min.) |
|---|---|---|---|---|
| 2-Ethylhexanol | 1.5 | 285 | 800 | 0.011 |
| Quinoline | 5.0 | 285 | 700 | 0.033 |
| 2-Ethylhexanol and Quinoline | 1.5 / 5.0 | 285 | 900 | 0.073 |
| 2-Ethylhexanol and Quinoline | 1.5 / 5.0 | 285 | 600 | 0.049 |
| 2-Ethylhexanol and Quinoline | 1.5 / 5.0 | 285 | 400 | 0.026 |
| 2-Ethylhexanol and Quinoline | 1.6 / 10.0 | 285 | 350 | 0.035 |
| Isopropanol | 1.5 | 240 | 2,400 | 0.005 |
| Quinoline | 5.0 | 240 | 2,400 | 0.008 |
| Isopropanol and 2-Methylquinoline | 1.5 / 5.0 | 240 | 2,000 | 0.033 |
| Isopropanol and Quinoline | 1.5 / 5.0 | 285 | 400 | 0.030 |
| Propylene Chlorohydrin and Quinoline | 1.5 / 5.0 | 285 | 700 | 0.044 |
| N-2-Hydroxyethyl Oleamide and Quinoline | 1.5 / 5.0 | 285 | 800 | 0.050 |
| Stearic Acid and Quinoline | 1.5 / 5.0 | 285 | 800 | 0.029 |

When mixed accelerators are employed, the resulting rates of hydrogenation have been found to be independent of hydrogen pressures above approximately 1,500 pounds per square inch gauge. Accordingly, no appreciable change in the conversion rate of naphthalene to tetralin is effected by a variance in hydrogen pressures above this level. At hydrogen pressures of from about 1,500 to 500 pounds per square inch gauge a gradual decrease in the rate of hydrogenation by a factor of approximately two has been found to occur. This effect may be seen in Table II, above. At hydrogen pressures below approximately 500 pounds per square inch gauge, the reaction rate rapidly decreases in a manner similar to that observed when only quinoline-type accelerators are used. Generally, hydrogen pressures of from about 1,500 to 500 pounds per square inch gauge have been found most satisfactory for use with mixed accelerators in the process of the invention.

When using mixed accelerators, best results have been obtained when the active-hydrogen accelerator component is present in concentrations of from about 0.5 to 5.0 parts of accelerator to 100 parts of naphthalene by weight. Concentrations of below about 0.1 part of active-hydrogen accelerator to 100 parts of naphthalene by weight have not been found to engender substantially increased rates of hydrogenation. The use of active-hydrogen accelerator concentrations above approximately 5.0 to 10.0 parts of accelerator to 100 parts of naphthalene by weight, though continuing to effect increased reaction rates, may result in the occurrence of foaming or solids formation within the reaction mass, which renders the subsequent separation of tetralin more difficult. Other operating considerations such as reaction temperature, catalyst and quinoline-type accelerator concentrations, and technique for carrying out the process, are the same as for use with only quinoline-type accelerators.

*Example I*

The following reactants were introduced to a 2 liter stainless steel autoclave fitted with a mechanical stirrer:

| | Grams |
|---|---|
| Naphthalene (80.2° C. freezing point) | 200 |
| Quinoline (10% isoquinoline and quinaldine) | 10 |
| Metallic sodium | 10 |

The autoclave was purged with hydrogen and a small positive pressure of hydrogen then applied. The reaction vessel was heated to a temperature of 50° C. and the hydrogen pressure adjusted to 1000 pounds per square inch gauge. The autoclave was subsequently heated to a temperature of 285° C. during an elapsed period of 60 minutes. Stirring was begun at 100° C. after the sodium and naphthalene had melted and continued during the course of the reaction. The autoclave was held at a temperature of 285° C.+3° C. until the pressure decreased by less than 10 pounds per square inch between readings made at 10 minute intervals. At this point, the autoclave was cooled. The pressure was released when the temperature reached 50° C.

The liquid product was removed from the autoclave and filtered to remove excess sodium and any solids formed during the reaction. The clear filtrate was analyzed for naphthalene content by ultraviolet spectroscopy and for tetralin by infrared analysis. The yield of tetralin calculated to be approximately 90 mole percent of the naphthalene introduced.

The first order hydrogenation rate constant, calculated from the record of pressure change as a function of time during the reaction was found to be 0.033/min. The result was verified by calculation from the naphthalene analysis of the reaction product.

*Example II*

The following reactants were introduced to a 2 liter stainless steel autoclave fitted with a mechanical stirrer:

| | Grams |
|---|---|
| Naphthalene (80.2° C. freezing point) | 200 |
| 2-ethylhexanol | 3 |
| Quinoline | 10 |
| Metallic sodium | 10 |

The autoclave was purged with hydrogen and a pressure of approximately 1000 pounds per square inch gauge was applied. The reactor was heated to a temperature of 285° C. and maintained at this level until the pressure decreased by less than 10 pounds per square inch between readings made at 10 minute intervals. At the completion of the reaction, the yield of tetralin was calculated to be approximately 93 mole percent of the naphthalene introduced. The hydrogenation rate constant for this reaction was calculated to be 0.049/min.

What is claimed is:

1. An improved process for the sodium catalyzed hydrogenation of naphthalene to tetralin which comprises reacting hydrogen with naphthalene in the presence of a catalytic amount of sodium and at least about 0.5 part per 100 parts by weight based upon said naphthalene of an aromatic heterocyclic compound containing a pyridine ring, at a reaction temperature of at least about 200° C. and under superatmospheric hydrogen pressure.

2. An improved process for the sodium catalyzed hydrogenation of naphthalene to tetralin which comprises reacting hydrogen with naphthalene in the presence of a catalytic amount of sodium and at least about 0.5 part per 100 parts by weight based upon said naphthalene of an aromatic heterocyclic compound containing a pyridine ring, at a reaction temperature of at least about 200° C. and under a hydrogen pressure of at least about 500 pounds per square inch gauge.

3. An improved process for the sodium catalyzed hydrogenation of naphthalene to tetralin which comprises reacting hydrogen with naphthalene in the presence of from about 0.5 part to about 5 parts of sodium and from about 0.5 parts to about 35 parts of quinoline per 100 parts by weight based upon said naphthalene, at a reaction temperature of at least about 200° C. and under a hydrogen pressure of at least about 500 pounds per square inch gauge.

4. An improved process for the sodium catalyzed hydrogenation of naphthalene to tetralin which comprises reacting hydrogen with naphthalene in the presence of from about 0.5 part to about 5 parts of sodium and from about 0.5 part to about 35 parts of 2-methylquinoline per 100 parts by weight based upon said naphthalene, at a reaction temperature of at least about 200° C. and under a hydrogen pressure of at least about 500 pounds per square inch gauge.

5. An improved process for the sodium catalyzed hydrogenation of naphthalene to tetralin which comprises reacting hydrogen with naphthalene in the presence of from about 0.5 part to about 5 parts of sodium and from about 0.5 part to about 35 parts of 4-methylquinoline per 100 parts by weight based upon said naphthalene, at a reaction temperature of at least about 200° C. and under a hydrogen pressure of at least about 500 pounds per square inch gauge.

6. An improved process for the sodium catalyzed hydrogenation of naphthalene to tetralin which comprises reacting hydrogen with naphthalene in the presence of from about 0.5 part to about 5 parts of sodium and from about 0.5 part to about 35 parts of 7-methylquinoline per 100 parts by weight based upon said naphthalene, at a reaction temperature of at least about 200° C. and under a hydrogen pressure of at least about 500 pounds per square inch gauge.

7. An improved process for the sodium catalyzed hydrogenation of naphthalene to tetralin which comprises reacting hydrogen with naphthalene in the presence of from about 0.5 part to about 5 parts of sodium and from about 0.5 part to about 35 parts of acridine per 100 parts by weight based upon said naphthalene, at a reaction temperature of at least about 200° C. and under a hydrogen pressure of at least about 500 pounds per square inch gauge.

8. An improved process for the sodium catalyzed hydrogenation of naphthalene to tetralin which comprises reacting hydrogen with naphthalene in the presence of a catalytic amount of sodium, at least about 0.5 part per 100 parts by weight based upon said naphthalene of an aromatic heterocyclic compound containing a pyridine ring and at least about 0.1 part per 100 parts by weight of said naphthalene of an organic compound possessing a hydrogen atom capable of being replaced by metallic sodium, at a reaction temperature of at least about 200° C. and under superatmospheric hydrogen pressure.

9. An improved process for the sodium catalyzed hydrogenation of naphthalene to tetralin which comprises reacting hydrogen with naphthalene in the presence of a catalytic amount of sodium, at least about 0.5 part per 100 parts by weight based upon said naphthalene of an aromatic heterocyclic compound containing a pyridine ring and at least about 0.1 part per 100 parts by weight of said naphthalene of an organic compound posessing a hydrogen atom capable of being replaced by metallic sodium, at a reaction temperature of at least about 200° C. and under a hydrogen pressure of at least about 500 pounds per square inch gauge.

10. An improved process for the sodium catalyzed hydrogenation of naphthalene to tetralin which comprises reacting hydrogen with naphthalene in the presence of a catalytic amount of sodium, at least about 0.5 part per 100 parts by weight based upon said naphthalene of an aromatic heterocyclic compound selected from the class consisting of quinoline and alkyl-substituted quinolines, and at least about 0.1 part per 100 parts by weight of said naphthalene of an organic compound possessing at least one alcoholic hydroxyl group, at a reaction temperature of at least about 200° C. and under a hydrogen pressure of at least about 500 pounds per square inch gauge.

11. An improved process for the sodium catalyzed hydrogenation of naphthalene to tetralin which comprises reacting hydrogen with naphthalene in the presence of a catalytic amount of sodium, from about 0.5 part to about 35 parts per 100 parts by weight based upon said naphthalene of an aromatic heterocyclic compound selected from the class consisting of quinoline and alkyl-substituted quinolines, and from about 0.1 part to about 10 parts of an aliphatic alcohol per 100 parts by weight based upon said naphthalene, at a reaction temperature of at least about 200° C. and under a hydrogen pressure of at least about 500 pounds per square inch gauge.

12. An improved process for the sodium catalyzed hydrogenation of naphthalene to tetralin which comprises reacting hydrogen with naphthalene in the presence of from about 0.5 part to about 5 parts of sodium, from about 0.5 part to about 35 parts of quinoline and from about 0.1 part to about 10 parts of isopropanol per 100 parts by weight based upon said naphthalene, at a reaction temperature of at least about 200° C. and under a hydrogen pressure of at least about 500 pounds per square inch gauge.

13. An improved process for the sodium catalyzed hydrogenation of naphthalene to tetralin which comprises reacting hydrogen with naphthalene in the presence of from about 0.5 part to about 5 parts of sodium, from about 0.5 part to about 35 parts of 2-methylquinoline and from about 0.1 part to about 10 parts of isopropanol per 100 parts by weight based upon said naphthalene, at a reaction temperature of at least about 200° C. and under a hydrogen pressure of at least about 500 pounds per square inch gauge.

14. An improved process for the sodium catalyzed hydrogenation of naphthalene to tetralin which comprises reacting hydrogen with naphthalene in the presence of from about 0.5 part to about 5 parts of sodium, from about 0.5 part to about 35 parts of 2-methylquinoline and from about 0.1 part to about 10 parts of 2-ethylhexanol per 100 parts by weight based upon said naphthalene, at a reaction temperature of at least about 200° C. and under a hydrogen pressure of at least about 500 pounds per square inch gauge.

15. An improved process for the sodium catalyzed hydrogenation of naphthalene to tetralin which comprises reacting hydrogen with naphthalene in the presence of from about 0.5 part to about 5 parts of sodium, from about 0.5 part to about 35 parts of 2-methylquinoline and from about 0.1 part to about 10 parts of propylene chlorohydrin per 100 parts by weight based upon said naphthalene, at a reaction temperature of at least about 200° C. and under a hydrogen pressure of at least about 500 pounds per square inch gauge.

16. An improved process for the sodium catalyzed hydrogenation of naphthalene to tetralin which comprises reacting hydrogen with naphthalene in the presence of from about 0.5 part to about 5 parts of sodium, from about 0.5 part to about 35 parts of 2-methylquinoline and from about 0.1 part to about 10 parts of N-2-hydroxyethyl oleamide per 100 parts by weight based upon said naphthalene, at a reaction temperature of at least about 200° C. and under a hydrogen pressure of at least about 500 pounds per square inch gauge.

17. An improved process for the sodium catalyzed hydrogenation of naphthalene to tetralin which comprises reacting hydrogen with naphthalene in the presence of from about 0.5 part to about 5 parts of sodium, from about 0.5 part to about 35 parts of 2-methylquinoline and from about 0.1 to about 10 parts of stearic acid per 100 parts by weight based upon said naphthalene, at a reaction temperature of at least about 200° C. and under a hydrogen pressure of at least about 500 pounds per square inch gauge.

References Cited in the file of this patent

UNITED STATES PATENTS

| | | |
|---|---|---|
| 2,055,708 | Scott et al. | Sept. 29, 1936 |
| 2,182,242 | Wooster | Dec. 4, 1939 |
| 2,432,843 | Whitman | Dec. 16, 1947 |

FOREIGN PATENTS

| | | |
|---|---|---|
| 147,488 | Great Britain | Oct. 10, 1921 |
| 885,153 | France | May 17, 1943 |